Dec. 5, 1967  J. L. HILTON ETAL  3,356,869
SINGLE PULSE POWER GENERATOR
Filed Nov. 15, 1963  3 Sheets-Sheet 3

INVENTORS
JOHN L. HILTON
MORGAN J. MORLEY
BY
Edward O. Ansell
ATTORNEY

United States Patent Office 3,356,869
Patented Dec. 5, 1967

3,356,869
SINGLE PULSE POWER GENERATOR
John L. Hilton, Walnut Creek, and Morgan J. Morley, Berkeley, Calif., assignors, by mesne assignments, to Aerojet General Corporation, El Monte, Calif., a corporation of Ohio
Filed Nov. 15, 1963, Ser. No. 324,133
15 Claims. (Cl. 310—10)

This invention relates generally to energy generation devices, and particularly, to explosive generators; that is, explosively-driven variable inductors which convert the chemical energy released in an explosion to electrical energy.

In many applications, it is essential that there be available, inexpensive and simple energy sources capable of delivering large amounts of pulsed electrical power in very short time intervals. Typical among these applications are energy sources for hypersonic wind tunnels, power sources for large scale forming of metal by magnetic pressure, power sources for high intensity X-ray tubes, lasers, or lights, ordnance requirements, and it is contemplated that such a power source will be required for the initiation of thermonuclear fusion reactors, presently under study and development. Until recently capacitor banks have been the principal practical method of delivering hundreds of kilojoules of pulsed electrical power in time intervals of 10–100 microseconds. With larger energy requirements, however, capacitor banks become increasingly costly and complicated.

One means of overcoming the problem was the development of an explosive generator device, generating current and hence, energy, by forcibly reducing the inductance of a circuit by means of an explosively-driven conductor. The device known in the prior art was in essence a copper helix or coil with an inner armature in the form of a concentric hollow copper cylinder which was filled with high energy explosive. Detonation of the explosive charge at one end of the armature caused the armature to expand into a cone moving at detonation velocity down the length of the device. The complete electrical circuit before detonation consisted of the coil, the armature, an electrical load, and a capacitor bank all in series. Discharge of the capacitor bank through the coil, load, and armature, created an excitation current in the circuit and set up a magnetic field in the coil. Detonation of the explosive was set at a predetermined delay interval to insure that the expanding armature cone contacted the edge of the coil at the time when the exciting current and magnetic field of the coil were at a maximum. This time of contact or striking is hereinafter designated "crowbar." The crowbar contact of the armature to the coil short-circuited the discharged capacitor bank out of the circuit. As the expanding armature moved against the magnetic field, shorting turn after turn of the coil, electrical energy was generated. The time of generation of energy after crowbar, was directly proportional to the length of the coil divided by the detonation velocity of the explosive. The duration of the output pulse of the prior device was thus controlled by the coil length. However, as coil length was reduced to shorten the pulse, the efficiency and amount of energy delivered decreased rapidly. Also, since the capacitor was discharged through the load in addition to the coil, the pulse length included the capacitor discharge time. This device was therefore limited to pulse lengths in excess of 100 microseconds.

Accordingly, the principal object of the present invention is to provide a novel method of and improved means for the generation of high energy pulsed electrical power.

Another object is to provide an improved "one-shot" high energy power generator of simple and economical construction.

Yet another object of the present invention is to provide an explosive power generation device with output pulse lengths of 1–50 microseconds and delivering large amounts of electrical power at a high conversion efficiency of stored chemical energy.

The device of the present invention comprises an explosive generator consisting of a field or excitation induction coil having at least the equivalent of one turn of conductive material concentrically wound about the outside of a generator induction coil also having at least the equivalent of one turn which then encompasses an inner concentric hollow copper cylinder, hereinafter called the armature or container, which is filled with a high energy explosive. The external electrical circuitry consists of two independent circuits. These are, (1) the field coil connected in series with a power source such as a capacitor bank capable of delivering the required field current and magnetic field, and (2) the generator coil connected in series with the armature and an external load. In operation, discharge of the power source through the field coil creates an excitation current in the circuit and causes a magnetic field to be developed within the space between the generator coil and armature. Subsequent detonation of the explosive at one end of the armature is so arranged that the cone formed by the expanding armature contacts the leading edge of the generator coil at the time when the current and magnetic field are at a maximum (crowbar). Output power generation begins initially as a result of the field coil forcing the magnetic field through the generator coil by action of the expanding conductive armature. After current is flowing in the generator coil, the magnetic field associated with this current is successively pushed through the remaining turns. This method of generation resembles an electrical conductor moving through a magnetic field. The electrical energy is, however, ultimately derived from the hydrodynamic energy of the expanding gases inside the armature. Initially the efficiency of generation will be directly proportional to the initial magnetic field produced by the field coil and inversely proportional to the impedance of the generator coil and serially connected load. While the initial efficiency is low, as the generation proceeds, more energy is stored in the remaining magnetic field and the efficiency is thereby improved. High efficiencies occur as the magnetic pressure opposing the armature motion approaches some significant fraction of the expanding pressure from the explosion. The magnetic flux within the generator coil and armature is displaced as burn continues, causing a higher magnetic energy density and corresponding magnetic pressure against the armature and the remaining volume. This feedback of energy in the circuit causes an ever-increasing current and therefore results in an ever-increasing efficiency, which is limited only when the diffusion of the magnetic field into the conductor surfaces raises the temperature of the conductor sufficiently to cause a large increase in the electrical resistance. When such resistive losses become excessively large, the current and magnetic field present in the circuit will decrease and the efficiency will rapidly diminish. The use of a separate field coil provides two important advances; (1) it eliminates the discharge of the capacitor through the load, thereby reducing the pulse length by the time of the capacitor discharge, and (2) staging of one generator after another is possible because the excitation coil of one device may comprise the load for a preceding device. This provides a progressively higher power output in each succeeding stage. Such staging was not possible in the prior art.

These and other novel objects, aspects, and features of the present invention will be readily seen from examination of the specification and the accompanying figures wherein.

Figure 1:
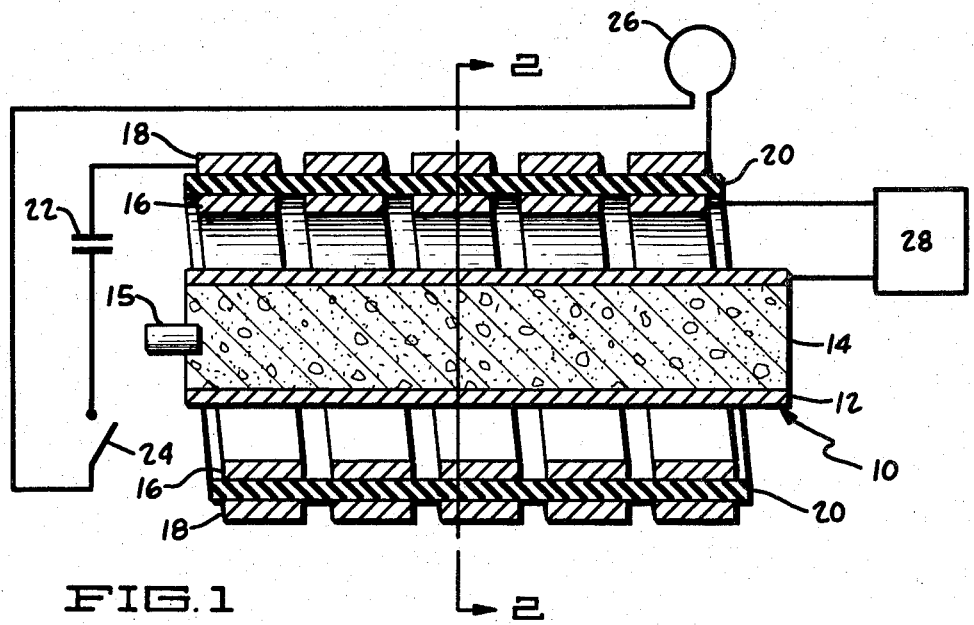
FIGURE 1 is a longitudinal sectional view of the novel energy producing device of the present invention taken along section line 1—1 of FIGURE 2.
Figure 2:
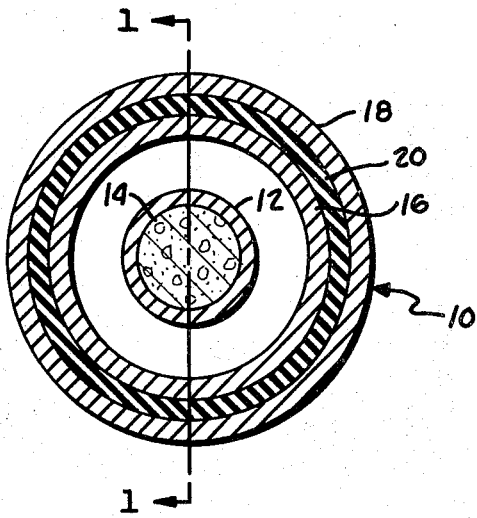
FIGURE 2 is a transverse sectional view of the novel energy producing device taken along section line 2—2 of FIGURE 1.

With reference to FIGURES 1 and 2, there is shown the novel energy producing device 10 of the present invention. There is provided an armature 12 filled with a high energy explosive 14. The armature 12 essentially comprises a hollow cylinder of a ductile, electrically conductive material such as copper. An example of the high explosive 14 would be cast Composition B. An ignitor 15 is provided at the front end of the high explosive 14. Concentrically arranged around the armature 12 are first, a generator coil 16 and a field coil 18. Each of these coils 16, 18 consists of an approximately equal number of turns of an electrical conductor such as copper. An electrical insulator 20, such as "Teflon" or "Mylar," is situated between the generator coil 16 and the field coil 18 to electrically insulate these elements. "Teflon" and "Mylar" are trademarks of E. I. du Pont de Nemours and Company of Wilmington, Del. "Teflon" is a plastic material comprising polytetrafluoroethylene, while "Mylar" is a plastic film material comprising a polyester of ethylene and glycol and terephthalic acid. The field coil is electrically connected in series to a power source 22, such as a capacitor bank, from which it receives electrical current. A starting switch 24 and quick opening but normally closed switch 26 are also serially connected to the field coil 18 and power source 22. A second electrical circuit serially connects the armature 12 and the generator coil 16 with an electrical load 28 of small inductance.

The power source 22 is discharged through the field coil 18 by closing the starting switch 24, e.g., a fast acting spark gap switch. As this discharge occurs, a current is built up in the field coil 18 and a corresponding magnetic field is developed within the space between the generator coil 16 and armature 12. The detonation of the high explosive 14 during the discharge at the front or detonator end causes the armature 12 to expand into a cone moving at detonation velocity down the length of the armature 12. This detonation, which can be set off by the ignitor 15, is timed so that the cone so formed contacts the leading edge of the generator coil 16 at the time when the current and magnetic field set up by the discharge of the power source through the field coil are at a maximum.

Figure 3:
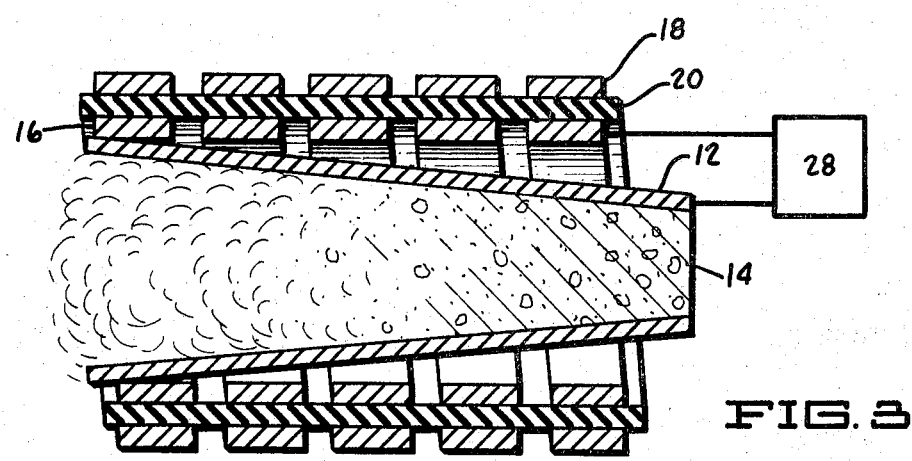
FIGURE 3 illustrates "crowbar" of the novel energy producing device.

An illustration of this contact or "crowbar" is shown in FIGURE 3. Timing of the detonation is achieved by means of a delayed electrical pulse, by "Primacord," or other suitable means. "Crowbar," between the cone of the armature 12 and the generator coil 16, closes the circuit between the generator coil 16, load 28, and armature 12. At the same instant as "crowbar," the quick opening switch 26 is opened by a delayed electrical pulse or Primacord. The opening of this switch 26, which can be a conductor wrapped around an explosive-filled "Teflon" tube, transfers the current established in the field coil 18 to the generator coil 16. This instantaneous transfer of current occurs by transformer action to conserve flux linkages. The transfer is facilitated since the circuits are coupled and the self and mutual inductance are approximately equal, i.e., the same flux links all the turns of both coils. For a description of this transfer, refer to "Static and Dynamic Electricity," W. R. Smythe, McGraw-Hill, section 9.041.

With the establishment of the high initial current in the generator coil, the efficient generation of electrical energy proceeds as the expanding armature shorts successive turns of the generator coil. The high initial current in the generator coil and the magnetic field associated therewith results in a high magnetic pressure upon which the explosive pressure must act, thereby producing a high efficiency. The efficiency further increases by the previously described feedback of energy which may be referred to as "bootstrapping." The generation proceeds until the limiting current and associated magnetic field resulting from the diffusion of the magnetic field into the conductor surface, are reached. This diffusion raises the temperature of the conductor to such an extent as to create a large increase in electrical resistance which rapidly decreases the efficiency of power generation. The device described above is capable of delivering hundreds of kilojoules of energy in a time interval of 10 microseconds, as compared to tens of megajoules in a 100-microsecond time interval for the prior art devices. By discharging the power source through the field coil and not through the load, the relatively long discharge time is eliminated. The high initial current in the generator coil greatly increases efficiency and therefore, power generation.

The coupling or staging of successive generators is possible and quite desirable to enhance operation. This coupling can be accomplished simply by utilizing the field coil of the second stage as the electrical load of the first stage. Since the generator efficiency is primarily dependent upon the strength of the magnetic field in the generator coil, a small inductance field coil which does not store much magnetic energy makes an ideal load. In addition, it is possible for successive devices to share the same armature.

Figure 4:
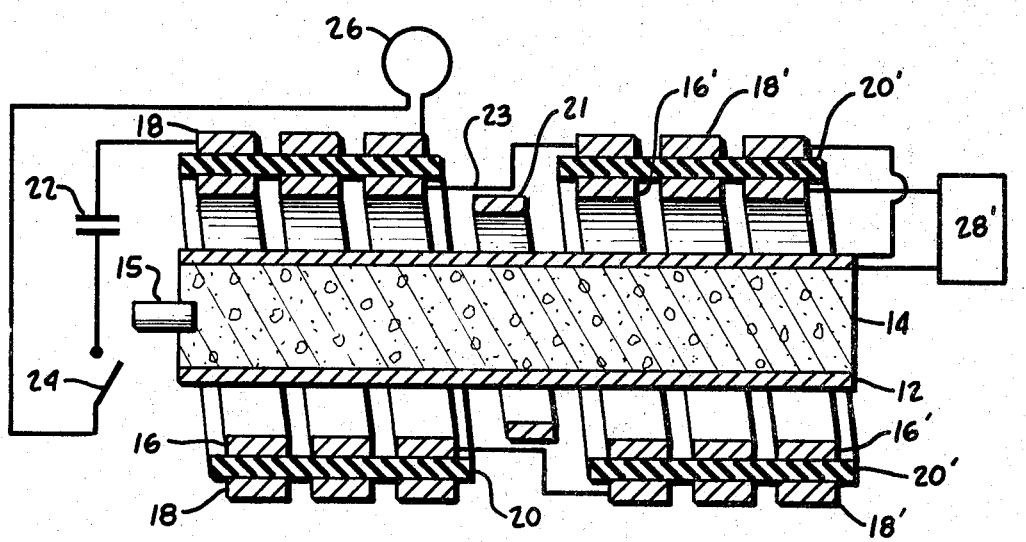
FIGURE 4 illustrates staging of two energy producing devices.

A staging arrangement is illustrated in FIGURE 4. The first stage essentially comprises the first embodiment illustrated in FIGURES 1 and 2. The first series electrical circuit, consisting of the starting switch 24, power source 22, field coil 18, and quick opening switch 26 is exactly the same. The armature 12, filled with high energy explosive 14, extends beyond this first stage. A second field coil 18' and generator coil 16' are concentrically arranged around this armature extension. An insulator 20', of "Teflon" or "Mylar," separates these two coils of the second stage. The second field coil 18' is connected in electrical series to the first generator coil 16 by means of the line 23. The second field coil 18' is serially connected to the armature 12. Thus the second field coil 18' serves as the load for the first device. A third series electrical circuit consists of the second generator coil 16', the armature 12, and an electrical load 28'. An insulating ring 21 of an inert non-conducting material such as "Teflon" or "Mylar" is positioned between the coils of the two stages.

Operation of the coupled devices is initiated by the timed discharge of the power source 22 and the detonation of the high energy explosive 14. "Crowbar" of the first generator coil 16 is achieved as previously described. This closes the circuit between the armature 12, first generator coil 16, and the second field coil 18'. As the expanding armature 12 shorts successive turns of the first generator coil 16 a current is built up in the second field coil 18'.

As the cone of the armature 12 continues down the length of the device, the second generator coil 16' is "crowbarred." This closes the circuit between the armature 12, the second generator coil 16', and the load 28'. Immediately after this "crowbar," the armature 12 drives the insulating ring 21 through the electrical line 23 between the first generator coil 16 and the second field coil 18', thereby breaking this circuit. The generation of power continues in the second device as successive turns are shorted.

As a result, the power output of the coupled devices represents the sum total of the individual stages. This output is, however, delivered over a single pulse length, namely that of the second, or last, stage. Thus the power delivered over a given pulse period is greatly increased. It is possible to combine or stage more than two devices to obtain an even greater power output over the same pulse period.

Figure 5:
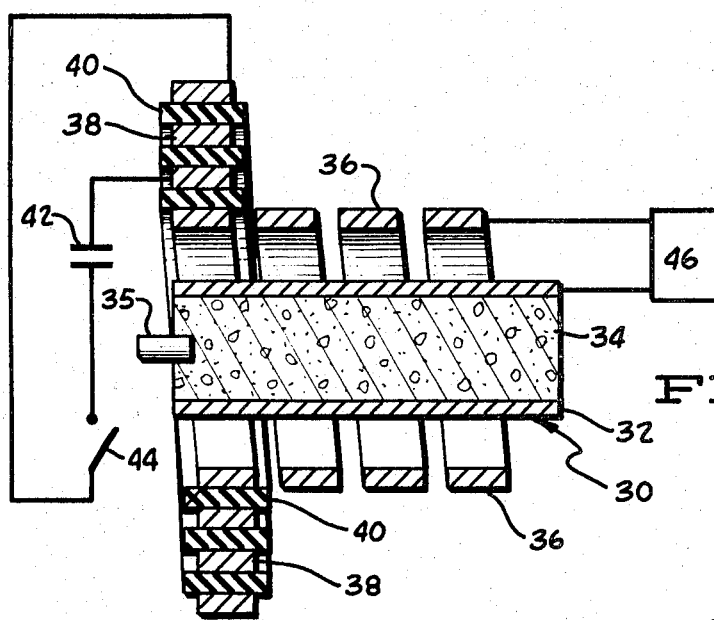
FIGURE 5 is a longitudinal sectional view of a first alternate embodiment of the novel energy producing device.

With reference to FIGURE 5, a first alternate embodiment of the energy producing device 30 is shown. It comprises an armature 32 filled with high-energy explosive 34 around which there is concentrically arranged a generator coil 36 and a field coil 38. The explosive 34 is provided with an igniter 35. The field coil 38 however, instead of extending the full length of the generator coil 36 is localized at the front or detonator end of the generator coil 36 and separated therefrom by an insulator 40. A single copper turn will suffice as the field coil 38 in certain applications. If additional impedance is required, additional insulated turns concentrically stacked upon the first can be utilized. The field coil 38 is electrically connected in series to a power source 42 and starting switch 44. As in the previous embodiment the armature 32 and generator coil 36 are serially connected to a low impedance electrical load 46. Operation is initiated by closing the starting switch 44, thereby discharging the power source 42 through the field coil 38. Detonation of the high explosive 34, by the ignitor 35, is again timed to produce "crowbar" when the maximum current is in the field coil 38. Since the field coil is localized at the beginning of the generator coil, a very intense magnetic field is produced at the start of generation. It is not necessary to employ the quick opening switch 26 of the first design, since the energy of the field coil is transferred into the generator coil by the action of the expanding armature, reducing the mutual inductance of both circuits. This results in an even more efficient generation of power as the expanding armature proceeds down the length of the device.

As in the first device, this first alternate embodiment can be coupled or staged either with another second embodiment or a first embodiment. Again, the field coil of the second device would serve as the load of the first device. Also, a common armature can be employed, extending the length of both devices.

Figure 7:
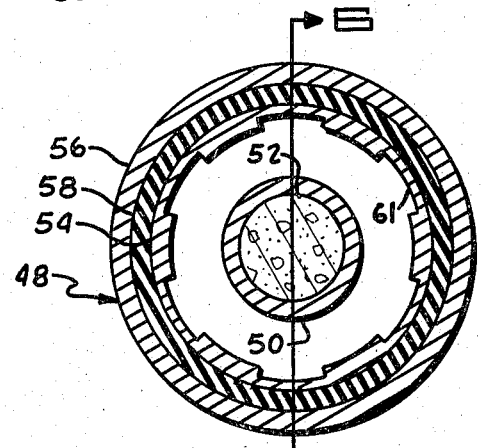
FIGURE 7 is a transverse sectional view of the novel energy producing device taken along section line 7—7 of FIGURE 6.
Figure 6:
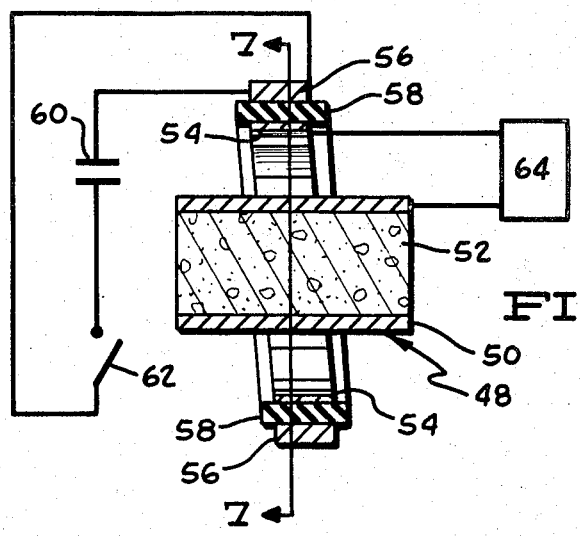
FIGURE 6 is a longitudinal sectional view of a second alternate embodiment of the novel energy producing device taken along section line 6—6 of FIGURE 7.

In FIGURES 6 and 7 there is shown a second alternate embodiment of the energy producing device 48 comprising an armature 50 filled with high energy explosive 52 around which there is concentrically arranged a generator coil 54 and field coil 56, each having a single turn or its equivalent. Both coils 54 and 56 may be composed of segmented sections. As in the second embodiment, the field coil 56 may consist of a stacked multi-turn coil and would be separated from the generator coil 54 by insulation 58. The electrical circuitry is the same as in the first alternate, namely the field coil 56 is serially connected to a power source 60 and starting switch 62 while the generator coil 54 and armature 50 are serially connected to a load 64. The operation is essentially the same as the first alternate.

Whereas the first alternate embodiment was designed to produce considerably more energy in the generator coil than was introduced into the field coil, the power generation of this second alternate embodiment will be slight. It is designed to basically transfer the energy built up over a relatively long period of time into a sudden microsecond release of energy in the load circuit. By using only a single turn generator coil or its equivalent, a pulse shorter than 10 microseconds can be achieved. The rate of energy transfer and therefore the voltage of the power taken out is determined by the time interval from closure of the armature, generator coil, load circuit to complete contact of the armature and generator coil. To emphasize this transfer capability of this embodiment, lengthwise slots 61, shown in FIGURE 7, can be provided on the inner surface of the generator coil 54 to permit better flux linkage of the circuits. In addition, the armature 50 can be slightly tapered, the smaller diameter being at the front or detonator end. In this manner, the interval between closure of the circuit and complete contact between armature and generator coil is further reduced.

While a number of details of construction and alternate embodiments have been illustrated and described, alternatives and equivalents will occur to those skilled in the art which are within the scope in spirit of this invention. It is therefore desired that the protection not be limited to the details herein illustrated and described but only by the proper scope of the appended claims.

What is claimed is:

1. An energy generation device comprising: a hollow cylindrical container of electrically conductive material, a high energy explosive arranged within said container, a first inductor concentrically arranged about said container in radially outwardly spaced relation thereto, a second inductor concentrically arranged about said first inductor and electrically insulated therefrom, a source of electrical power connected to said second inductor for establishing a magnetic field in the space between said first inductor and said container upon energization of said second inductor, and said container being progressively expanded into contact with said first inductor along its length in response to the detonation of said high energy explosive at one end of said container whereby the magnetic field established between said container and said first inductor is forced through said first inductor.

2. An energy generation device as described in claim 1 and in addition an igniter attached to said high energy explosive at said one end of said container and actuatable to initiate detonation of said high energy explosive.

3. An energy generation device comprising: a hollow cylindrical container of electrically conductive ductile material, a high energy explosive arranged within said container, a first induction coil of electrically conductive material concentrically arranged about said container in radially outwardly spaced relation thereto, a second induction coil of electrically conductive material concentrically arranged about said first induction coil, an electrical insulator interposed between said first and second induction coils to electrically insulate said first induction coil from said second induction coil, an electrical capacitor bank providing a source of electrical power connected to said second induction coil in an electrical circuit for establishing a magnetic field in the space between said first induction coil and said container upon energization of said second induction coil, an actuating switch means in the electrical circuit including said capacitor bank and said second induction coil and operable to complete the electrical circuit for energizing said second induction coil, and said container being progressively expanded from one end to the other in response to the detonation of said high energy explosive at said one end of the container to progressively contact said first induction coil at detonation velocity along its length for generating high energy pulsed electrical power.

4. An energy generation device comprising: a hollow cylindrical container of electrically conductive material, a high energy explosive arranged within said container, a first inductor concentrically arranged about said container in radially outwardly spaced relation thereto, a second inductor concentrically arranged about said first inductor and electrically insulated therefrom, said first and second inductors having substantially the same inductance, a source of electrical power connected to said second inductor for establishing a magnetic field in the space between said first inductor and said container upon energization of said second inductor, and said container being progressively expanded into contact with said first inductor along its length in response to the detonation of said high energy explosive at one end of said container whereby the magnetic field established between said container and said first inductor is forced through said first inductor.

5. An energy generation device comprising: a hollow cylindrical container of electrically conductive material, a high energy explosive arranged within said container, a first inductor concentrically arranged about said container in radially outwardly spaced relation thereto, a second inductor concentrically arranged about said first inductor and electrically insulated therefrom, said first and second inductors having substantially the same inductance, a source of electrical power connected to said second inductor in an electrical circuit for establishing a magnetic field in the space between said first inductor and said container upon energization of said second inductor, an actuating switch means connected in the electrical circuit including said second inductor and said source of electrical power and operable to complete the electrical circuit for energizing said second inductor, a quick opening switch means also connected in the electrical circuit including said second inductor, said source of electrical power, and said actuating switch means and being operable to transfer electrical energy from said second inductor to said first inductor, and said container being progressively expanded into contact with said first inductor along its length in response to the detonation of said high energy explosive at one end of said container such that said quick opening switch means opens at the instant said container first contacts said first inductor, whereby high energy pulsed electrical power is generated as said container progressively contacts said first inductor at detonation velocity along its length.

6. An energy generation device comprising: a hollow cylindrical container of electrically conductive material, a high energy explosive arranged within said container, a first inductor concentrically arranged about said container in radially outwardly spaced relation thereto, said first inductor extending longitudinally along the length of said container in spaced relation thereto, a second inductor concentrically arranged about said first inductor and electrically insulated therefrom, said second inductor being disposed about one end only of said first inductor and having an axial extent substantially shorter than the axial extent of said first inductor, a source of electrical power connected to said second inductor for establishing a magnetic field in the space between said first inductor and said container upon energization of said second inductor, and said container being progressively expanded into contact with said first inductor along its length in response to the detonation of said high energy explosive at one end of said container whereby the magnetic field established between said container and said first inductor is forced through said first inductor.

7. An energy generation device comprising: a hollow cylindrical container of electrically conductive material, a high energy explosive arranged within said container, a first inductor concentrically arranged about said container in radially outwardly spaced relation thereto, a second inductor concentrically arranged about said first inductor and electrically insulated therefrom, a source of electrical power connected to said second inductor in an electrical circuit for establishing a magnetic field in the space between said first inductor and said container upon energization of said second inductor, an actuating switch means connected in the electrical circuit including said second inductor and said source of electrical power and operable to complete the electrical circuit for energizing said second inductor, and said container being progressively expanded into contact with said first inductor along its length in response to the detonation of said high energy explosive at one end of said container whereby the magnetic field established between said container and said first inductor is forced through said first inductor.

8. An energy generation device comprising: a hollow cylindrical container of electrically conductive material, a high energy explosive arranged within said container, a first inductor concentrically arranged about said container in radially outwardly spaced relation thereto, said first inductor comprising a coil having a single turn only, a second inductor concentrically arranged about said first inductor and electrically insulated therefrom, said second inductor comprising a coil having at least one turn and having an axial extent substantially equal to the axial extent of said first inductor, a source of electrical power connected to said second inductor in an electrical circuit for establishing a magnetic field in the space between said first inductor and said container upon energization of said second inductor, and said container being progressively expanded into contact with said first inductor in response to the detonation of said high energy explosive whereby the magnetic field established between said container and said first inductor is forced through said first inductor.

9. An energy generation device as defined in claim 8, wherein said first inductor is provided with a plurality of circumferentially spaced axial slots in its internal surface opening toward said container.

10. An energy generation device comprising: a hollow container of electrically conductive material, a high energy explosive arranged within said container, a first inductor having a segmented single turn concentrically arranged about said container in radially outwardly spaced relation thereto, a second inductor having a segmented single turn concentrically arranged about said first inductor and electrically insulated therefrom, a capacitor bank comprising a source of electrical power connected to said second inductor in an electrical circuit for establishing a magnetic field in the space between said first inductor and said container upon energization of said second inductor, an actuating switch means connected in the electrical circuit including said second inductor and said capacitor bank and operable to complete the electrical circuit for energizing said second inductor, and said container being progressively expanded into contact with said first inductor in response to the detonation of said high energy explosive whereby the magnetic field established between said container and said first inductor is forced through said first inductor.

11. An energy generation device as described in claim 10 wherein said container is tapered along its length, the smaller diameter of said container being located at the end thereof where detonation of said high energy explosive is to occur.

12. An energy generation device comprising: a hollow cylindrical container of electrically conductive material, a high energy explosive arranged within said container, a first inductor concentrically arranged about one portion of said container in radially outwardly spaced relation thereto, a second inductor concentrically arranged about said first inductor and electrically insulated therefrom, a source of electrical power connected to said second inductor in an electrical circuit for establishing a magnetic field in the space between said first inductor and said container upon energization of said second inductor, a third inductor concentrically arranged about another portion of said container in radially outwardly spaced relation thereto, a fourth inductor concentrically arranged about said third inductor and electrically insulated therefrom, said fourth inductor being electrically connected in series to said container and said first inductor, and said container being progressively expanded into contact with said first inductor and said third inductor sequentially along their lengths in response to the detonation of said high energy explosive at one end of said container whereby the magnetic field established between said container and said first inductor is forced through said first inductor and staged to said third inductor through which the magnetic field is forced as progressive expansion of said container continues.

13. An energy generation device comprising: a hollow cylindrical armature, a first inductor means concentrically arranged about said armature in radially outwardly spaced relation thereto, second inductor means concentrically arranged about said first inductor means and electrically insulated therefrom, a source of electrical power connected to said second inductor means in an electrical circuit for establishing a magnetic field in the space between said first inductor means and said armature upon energization of said second inductor means, means for progressively expanding said armature into contact with said first inductor means along its length to successively shorten the effective electrical length of said first inductor means whereby the magnetic field established between said armature and said first inductor means is forced through said first inductor means.

14. An energy generation device comprising: a substantially cylindrical container of electrically conductive material, a high energy explosive charge filling said container, a helical generator coil of electrically conductive material concentrically arranged about said container in radially outwardly spaced relation thereto, a helical field coil of electrically conductive material concentrically arranged about said generator coil, an electrical insulator interposed between said generator coil and said field coil to maintain said field coil in insulated, radially outwardly spaced relation to said generator coil, a source of electrical power connected to said field coil in an electrical circuit for establishing a magnetic field in the space between said generator coil and said container upon energization of said field coil, and said container being progressively expanded from one end to the other in response to the detonation of said explosive charge at said one end of the container to progressively contact the generator coil at detonation velocity along its length for generating high energy pulsed electrical power.

15. An energy generation device comprising: a first cylindrical container adapted to hold a high energy explosive, a first inductor concentrically arranged about said first container, a second inductor concentrically arranged about said first inductor and electrically insulated therefrom, said second inductor adapted for series electrical connection to a power source, a second cylindrical container adapted to hold a high energy explosive, a third inductor concentrically arranged about said second container, and a fourth inductor concentrically arranged about said third inductor and electrically insulated therefrom, said first container, said second container, said fourth inductor and said first inductor adapted for series electrical connection respectively, said third inductor adapted for series electrical connection to an electrical load and said second container.

References Cited
UNITED STATES PATENTS

| | | | |
|---|---|---|---|
| 3,113,272 | 12/1963 | Cannon et al. | 328—1 |
| 3,127,528 | 3/1964 | Lary et al. | 310—11 |
| 3,225,227 | 12/1965 | Biehl | 310—11 |

MILTON O. HIRSHFIELD, *Primary Examiner.*

BENJAMIN A. BORCHELT, *Examiner.*

W. ROCH, D. DUGGAN, *Assistant Examiners.*